United States Patent
Gaillard et al.

(10) Patent No.: US 12,116,144 B2
(45) Date of Patent: Oct. 15, 2024

(54) ANCHOR FOR SECURING AN AIRCRAFT TO A LANDING GRID AND AIRCRAFT

(71) Applicant: AIRBUS HELICOPTERS, Marignane (FR)

(72) Inventors: Christophe Gaillard, La Roque d'Antheron (FR); Joel Durantet, Cabries (FR); Nicolas Raspic, Ensues la Redonne (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/889,689

(22) Filed: Aug. 17, 2022

(65) Prior Publication Data
US 2023/0094764 A1  Mar. 30, 2023

(30) Foreign Application Priority Data
Sep. 30, 2021  (FR) ...................................... 2110327

(51) Int. Cl.
*B64F 1/12* (2006.01)
*B64C 25/52* (2006.01)
*B64C 25/32* (2006.01)

(52) U.S. Cl.
CPC .............. *B64F 1/125* (2013.01); *B64C 25/52* (2013.01); *B64C 2025/325* (2013.01)

(58) Field of Classification Search
CPC .................................. B64F 1/12; B64F 1/125
See application file for complete search history.

(56) References Cited

U.S. PATENT DOCUMENTS

| | | | |
|---|---|---|---|
| 3,151,826 A | 10/1964 | Victor | |
| 3,877,664 A * | 4/1975 | Mesnet | E01F 3/00 244/115 |
| 4,319,722 A * | 3/1982 | Pesando | B64F 1/125 244/116 |
| 5,480,108 A | 1/1996 | Amiand | |
| 8,783,608 B2 * | 7/2014 | Affre de Saint Rome | B64F 1/125 244/114 R |
| 9,359,089 B2 * | 6/2016 | Mardini | B64F 1/125 |
| 9,499,281 B2 * | 11/2016 | Cardell | E01F 3/00 |

(Continued)

FOREIGN PATENT DOCUMENTS

| | | | | |
|---|---|---|---|---|
| CN | 109540485 A * | 3/2019 | | B64F 1/125 |
| CN | 112744104 A * | 5/2021 | | B60L 53/16 |

(Continued)

OTHER PUBLICATIONS

French Search Report for French Application No. FR2110327, Completed by the French Patent Office, Dated May 24, 2022, 8 pages.

(Continued)

*Primary Examiner* — Joseph W Sanderson
(74) *Attorney, Agent, or Firm* — Brooks Kushman P.C.

(57) ABSTRACT

An anchor for an aircraft. The anchor comprises a jack comprising a housing and a head that is able to move in translation in relation to the housing along an elevation axis, the head having three degrees of rotational freedom respectively about a longitudinal axis as well as a transverse axis and the elevation axis, the anchor comprising a member for taking up forces surrounding the jack and provided with a fastening suitable for being secured to the aircraft.

20 Claims, 6 Drawing Sheets

(56) References Cited

U.S. PATENT DOCUMENTS

| | | | |
|---|---|---|---|
| 10,479,527 B2* | 11/2019 | Bistuer | ................... B64C 25/32 |
| 2004/0256519 A1* | 12/2004 | Ellis | ....................... B64F 1/007 |
| | | | 244/110 E |
| 2005/0269450 A1 | 12/2005 | Muylaert et al. | |
| 2012/0091272 A1 | 4/2012 | Affre De Saint Rome | |
| 2015/0151852 A1* | 6/2015 | Cardell | ................... B64F 1/125 |
| | | | 244/110 E |
| 2015/0217871 A1 | 8/2015 | Mardini et al. | |
| 2018/0086482 A1* | 3/2018 | Bistuer | ................... B64F 1/125 |

FOREIGN PATENT DOCUMENTS

| | | | | |
|---|---|---|---|---|
| ES | 2425019 A1 * | 10/2013 | ............. | B64F 1/125 |
| FR | 1253269 A | 2/1961 | | |
| FR | 1291049 A | 4/1962 | | |
| FR | 2701689 A1 | 8/1994 | | |
| FR | 2708249 A1 | 2/1995 | | |
| FR | 2943988 A1 | 10/2010 | | |
| FR | 2982241 A1 | 5/2013 | | |
| NL | 8900653 A * | 10/1990 | ............. | B64F 1/125 |
| WO | 9104910 A1 | 4/1991 | | |

OTHER PUBLICATIONS

First Office Action for Korean Application No. 10-2022-0120673, dated May 20, 2024, 8 Pages.

* cited by examiner

ANCHOR FOR SECURING AN AIRCRAFT TO A LANDING GRID AND AIRCRAFT

CROSS REFERENCE TO RELATED APPLICATIONS

This application claims priority to French patent application No. FR 2110327 filed on Sep. 30, 2021, the disclosure of which is incorporated in its entirety by reference herein.

TECHNICAL FIELD

The present disclosure relates to an anchor for securing an aircraft on a landing grid and an aircraft provided with such an anchor.

BACKGROUND

An aircraft may be landed on a moving surface or one exposed to wind, for example on a ship. The aircraft may therefore be provided with a system allowing it to be kept in a substantially stationary position regardless of the wind and/or, if applicable, the movement of the ship and, in particular, its inclination in terms of pitch and roll.

An anchoring harpoon is generally arranged under the fuselage of the aircraft, between the landing gear wheels or indeed between the skids of a skid landing gear. The harpoon comprises a movable harpoon head. The harpoon head is provided with a clamp, a finger or the like that automatically locks when landing on a landing grid of a platform. Such a grid is sometimes referred to as a "deck landing grid" in the context of a ship.

Moreover, the anchoring harpoon makes it possible, after anchoring, by applying a pulling force between the anchoring point and the aircraft, to hold the aircraft against the platform in order to increase its stability and ensure it is kept on the platform. The anchoring harpoon therefore makes it possible, within a certain range of inclination of the ship and within a certain range of wind speeds, to temporarily replace a mooring system.

An anchoring harpoon comprises a means for deploying the harpoon head that makes it possible to move the harpoon head during landing and apply a pulling force to the harpoon head in order to hold the aircraft against the platform.

The means for deploying the harpoon head generally comprises a hydraulic jack, in particular on a medium or heavy aircraft requiring powerful harpoons, or an electrical or pneumatic jack on more lightweight aircraft.

An anchoring harpoon is advantageous and effective, but can be relatively heavy because the harpoon is likely to be subjected to considerable forces. Moreover, arranging it under the fuselage may be challenging when other additional equipment is present, for example cameras, lights, RADAR systems, etc.

For example, documents FR 2 701 689 A1, FR 2 943 988 A1 and FR 2 982 241 A1 describe anchoring harpoons.

Document FR 2 701 689 A1 discloses a harpoon having a harpoon head comprising a pin. The pin is provided with fingers that are oriented and movable radially, means for moving the fingers and keeping them in the extended position, and means for unlocking the fingers.

Document FR 2 943 988 A1 describes a gas anchoring harpoon provided with a rod. A free end of the rod comprises a harpoon head equipped with retaining fingers that can be moved between a retracted position and an active position by control means.

Document FR 2 982 241 A1 describes a harpoon having a bistable actuator.

Document FR 2 708 249 A1 describes an adapter for a take-off and landing aid system for helicopters. The adapter is provided with a head for automatic anchoring in a landing grid.

Document WO 91/04910 A1 describes a retaining device, for retaining an aircraft on the deck of a ship, for example. The retaining device comprises an arm articulated to an aircraft and to two jacks. The arm comprises an actuator cooperating with a head. The head comprises two hooks that are intended to grip a separator of a deck landing grid, the separator being arranged between two apertures.

Document FR 1 291 049 A describes a mooring device. The mooring device comprises a jack provided with a piston secured to a control rod. The mooring device comprises a head carried by the control rod. The head comprises a guiding tip and two hooks.

Document FR 1 253 269 A describes a retaining device with a retractable screw for an aircraft. The screw is deployed before landing and set in rotation in order to be screwed to a platform covered with contiguous orientable nuts.

SUMMARY

The object of the present disclosure is therefore to propose not a harpoon that is anchored in a landing grid, but an anchor that is likely to be less complex and heavy than a harpoon, in order to tend to limit the sliding of an aircraft with skids.

The present disclosure relates to an anchor for an aircraft. This anchor comprises a jack comprising a housing and a head that is able to move in translation in relation to the housing along an elevation axis, said head having three degrees of rotational freedom respectively about a longitudinal axis as well as a transverse axis and the elevation axis, for example in relation to, inter alia, an airframe of the aircraft, said anchor comprising a member for taking up forces surrounding the jack and provided with a fastening suitable for being secured to the aircraft.

The jack may be an electrical, pneumatic or indeed hydraulic jack. The jack may be connected in a usual manner to a control interface in order to be extended, if necessary, on the ground, or retracted, in particular in flight.

The jack can therefore move the head of the anchor in translation towards a conventional landing grid after landing in order to engage the head in the landing grid. Such a landing grid conventionally comprises apertures and separators separating the adjacent apertures. The three degrees of rotational freedom of the head of the anchor therefore allow it to reach an immobilisation position, the head penetrating at least partially into one aperture or into two apertures by positioning itself to either side of a separator of the grid. When the head is in position in the landing grid, the member for taking up forces limits the movement of the jack in relation to the aircraft and, when in abutment, transmits the forces experienced to the aircraft. As a result, the movements of the aircraft in relation to the landing grid are limited. The head may have an unchanging/fixed shape not comprising any parts that can move in relation to each other, unlike a head provided with a clamp or at least one locking finger that can move in translation, for example.

An aircraft may therefore comprise one or more anchors that each help limit the sliding of the aircraft, the anchors not applying any pulling force, unlike a harpoon. Each anchor may therefore be compact and relatively lightweight, the forces experienced being taken up directly by the aircraft.

Indeed, contrary to existing preconceptions, an anchoring harpoon providing a pulling force does not necessarily need to be used. Depending on the nature of the aircraft, the climatic conditions, the characteristics of the ship or floating bridge and the sea state, the present disclosure proposes the use of an anchor. An aircraft may be relatively stable on the deck of a boat, at least for certain deck movements, in particular an aircraft that is relatively lightweight and/or has skids. Therefore, such an anchor may be sufficient in conditions of limited deck movements and a reasonable sea state. The anchor prevents the aircraft from sliding over the deck of the boat, and the risk of tipping is zero when deck movements are limited.

The anchor may also comprise, in particular, one or more of the following features, taken individually or in combination.

The anchor may comprise a support carrying said jack, the jack being able to rotate in relation to the support about the longitudinal axis and the transverse axis, the head being able to rotate in relation to the housing about the elevation axis.

For example, the support comprises a support member connected to the jack by an articulation. This simple configuration easily gives the head the required mobility. The support may be lightweight because the radial forces experienced in the event of sliding are transmitted via the member for taking up forces.

According to one possibility compatible with the preceding possibility, the head may comprise a free end comprising two abutments suitable/configured in order to penetrate together into a same aperture of a landing grid, said two abutments being stationary in relation to each other and separated from each other by a space suitable for receiving a separator of said landing grid separating two said apertures.

The head thus comprises two elongate elements forming two abutments forming a fork. Therefore, the two abutments are configured to together grip a separator by penetrating into two apertures, and to be able to be inserted into a same aperture.

According to one possibility compatible with the preceding possibilities, the two abutments may each comprise an end section that tapers away from the housing.

When the jack extends, this feature promotes the rotation of the head in relation to the landing grid in order to reach its immobilisation position either in one aperture or in two apertures around a separator, depending on the initial point of contact between the head and the landing grid.

According to one possibility compatible with the preceding possibilities, at least one tapered end section may be rounded.

When the jack extends, this feature promotes the rotation of the head, in relation to the landing grid, in order to engage in the landing grid, preventing locking before an immobilisation position is reached.

According to one possibility compatible with the preceding possibilities, the two abutments may be different.

When the jack extends, this feature promotes the rotation of the head, in relation to the landing grid, in order to engage in the landing grid, preventing locking before an immobilisation position is reached. The shape of the head is asymmetrical in order to prevent the jack from locking while the head is not correctly positioned. The asymmetrical shape may optionally promote rotation of the head in one direction.

According to one possibility compatible with the preceding possibilities, one of said two abutments may extend parallel to the elevation axis over a first length and the other abutment extends parallel to the elevation axis over a second length greater than the first length.

When the jack extends, this feature promotes the rotation of the head, in relation to the landing grid, in order to engage in the landing grid, tending to prevent locking in a non-optional position. This feature helps prevent the head from coming into contact with the landing grid at two points simultaneously and failing to reach an immobilisation position.

According to one possibility compatible with the preceding possibilities, said two abutments may each comprise a concave rounded outer face with respect to the elevation axis, i.e., when viewed from the elevation axis.

The apertures of a landing grid are usually cylindrical in shape. Therefore, the outer faces may have a shape that matches the wall delimiting an aperture in order to ensure optimal hold in an aperture.

According to one possibility compatible with the preceding possibilities, the two abutments may each comprise a convex rounded inner face with respect to the elevation axis, i.e., when viewed from the elevation axis.

The inner faces may have a shape that matches walls of a separator in order to ensure optimal hold when the head is fitted around this separator. If applicable, this shape tends to promote the sliding of the head against the landing grid in order to reach an immobilisation position. The clearance between the separator and the head may be minimized.

According to one possibility compatible with the preceding possibilities, one of the two abutments may comprise an oval shape in a plane orthogonal to the elevation axis and the other abutment has a truncated oval shape in said plane.

When the jack extends, this feature promotes the rotation of the head, in relation to the landing grid, in order to engage in the landing grid.

The present disclosure also relates to an assembly comprising a landing grid provided with a plurality of apertures, each aperture being separated from an adjacent aperture by a separator of the landing grid. This assembly thus comprises one said anchor, said abutments together having a shape that can fit into each aperture, said space having a shape that can contain each separator.

The present disclosure also relates to an aircraft comprising at least one said anchor.

The aircraft comprises a landing gear, the fastening of the member for taking up forces being secured to the landing gear or to a bracket rigidly connected to an airframe of the aircraft.

The anchor being able to comprise a support carrying the jack and the aircraft being able to comprise a landing gear, the support may be fastened to the landing gear or to a bracket rigidly connected to an airframe of the aircraft.

The anchor may possibly be attached to the landing gear as such or indeed to a bracket fastened to an airframe of the aircraft or to the landing gear, for example.

The anchor may in particular not be arranged under the airframe, unlike a harpoon. Such an arrangement, in particular on the landing gear, may facilitate the fitting and/or the removal of the anchor. This arrangement may avoid hindering access to the underside of the aircraft and/or the installation of other equipment, such as monitoring equipment including optronic pods, lights, cameras or RADAR systems, for example.

According to one possibility, the landing gear may be a skid landing gear, the fastening and the support being able to be fastened to a skid of the landing gear, the support being able to have an articulation carrying the jack, the articulation being able to be situated above the member for taking up forces when the aircraft is landed.

The jack may be mounted on an articulation such as a ball joint or a universal joint of the support in order to have angular freedom of movement at least about the longitudinal axis and the transverse axis. This articulation may be offset vertically from the ground, being above the member for taking up forces. The radial forces introduced into the jack when the aircraft slides are then taken up by the member for taking up forces at the skid.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
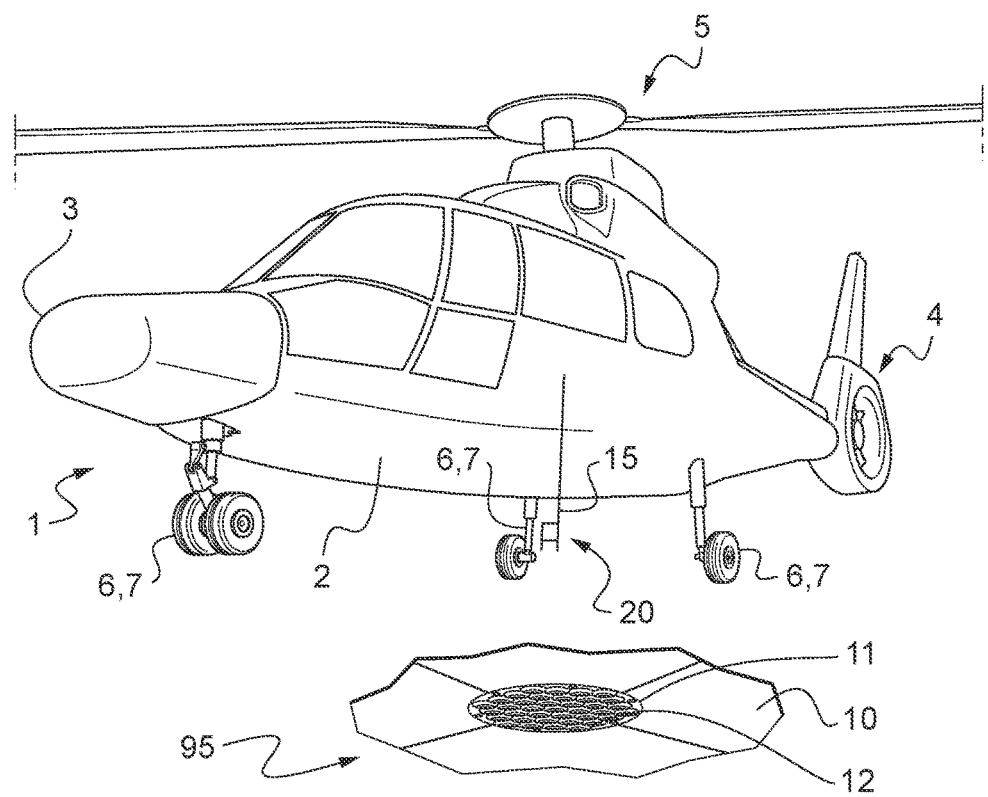
FIG. 1 is an example of an aircraft according to the disclosure having a wheel landing gear.
Figure 2:
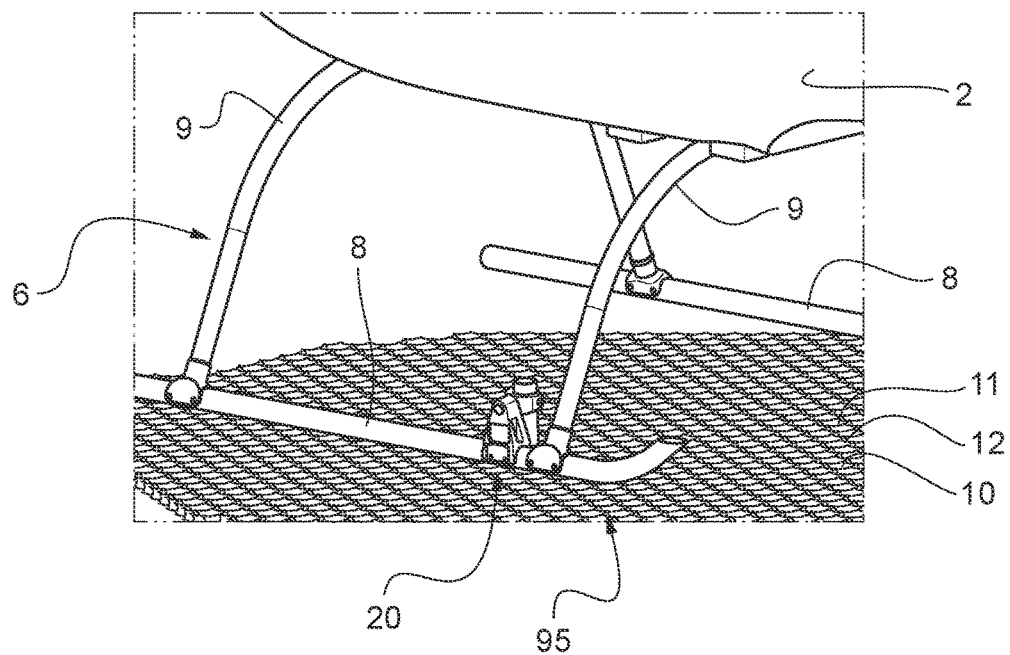
FIG. 2 is an example of an aircraft according to the disclosure having a skid landing gear.

FIGS. 1 and 2 show examples of aircraft 1 according to the present disclosure. Such an aircraft 1 may be an aircraft with or without a pilot on board.

As shown in FIG. 1, the aircraft 1 may comprise at least one rotary wing 5 carried by an airframe 2, the airframe 2 being able, for example, to extend from a nose 3 towards a tail 4.

Moreover, and regardless of the embodiment, the aircraft 1 may comprise one or more landing gears 6. According to FIG. 1, the aircraft 1 may comprise several landing gears each comprising at least one wheel 7. According to FIG. 2, the aircraft 1 may comprise a skid landing gear 8. Such a skid landing gear comprises, for example, at least two skids 8 and at least two crossbars 9.

Irrespective of the nature of the aircraft 1 and the type of landing gear it comprises, an aircraft 1 may comprise at least one anchor 20 configured to be able to be engaged in a landing grid 10 in an immobilisation position. An anchor 20 and a landing grid 10 may form an assembly 95. In a conventional manner, the landing grid 10 may comprise a structure delimiting apertures 11, the structure having separators 12 between the adjacent apertures 11. The apertures 11 are, for example, circular-cylindrical in shape.

Such an anchor 20 may be carried by a bracket 15. This bracket 15 may be secured to the airframe 2 or the like according to the example of FIG. 1, or directly to a landing gear according to the example of FIG. 2, in which an anchor 20 is fastened to a skid 8.

Figure 3:
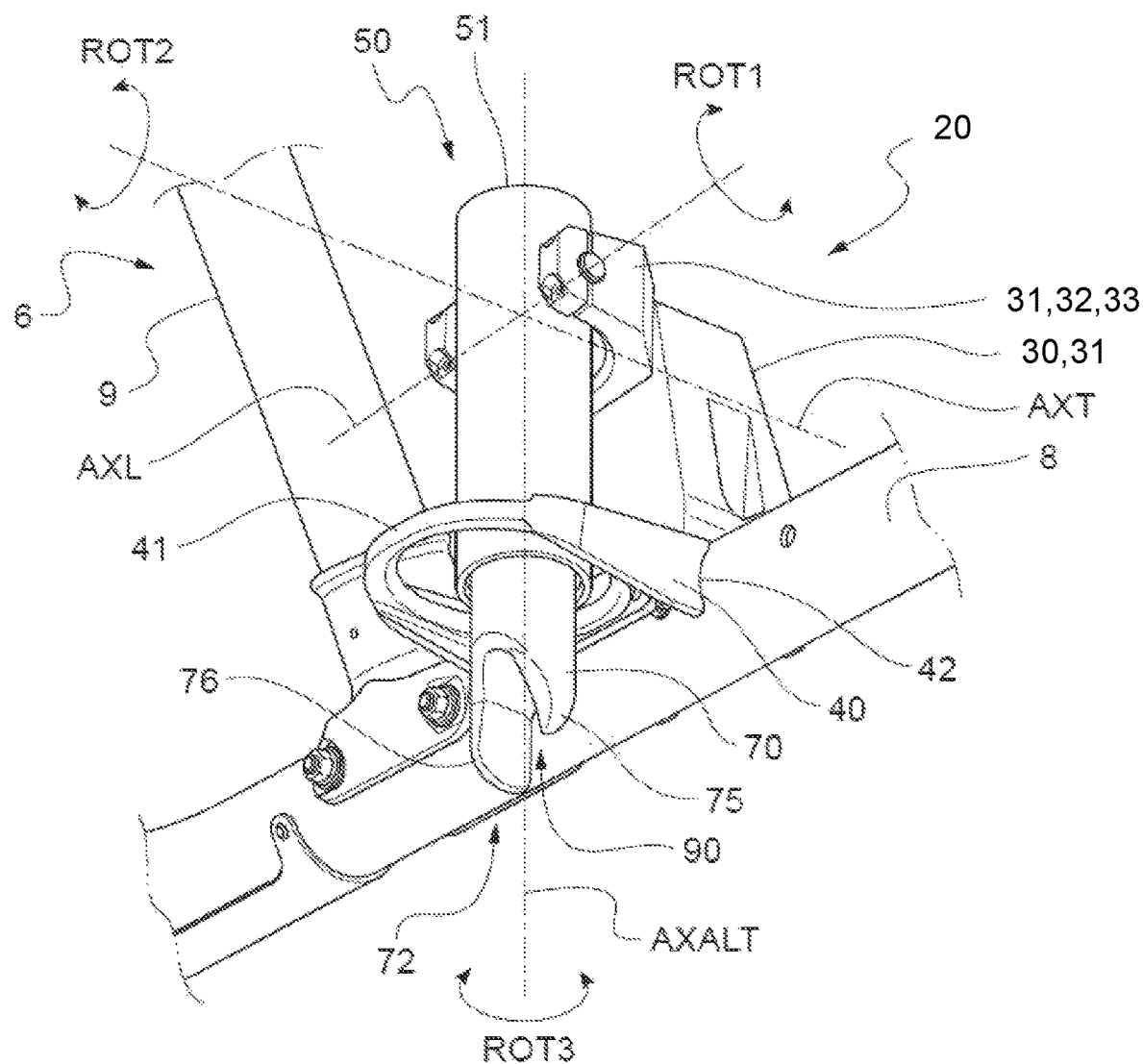
FIG. 3 is a three-dimensional view of an anchor according to the disclosure, when extended.
Figure 4:
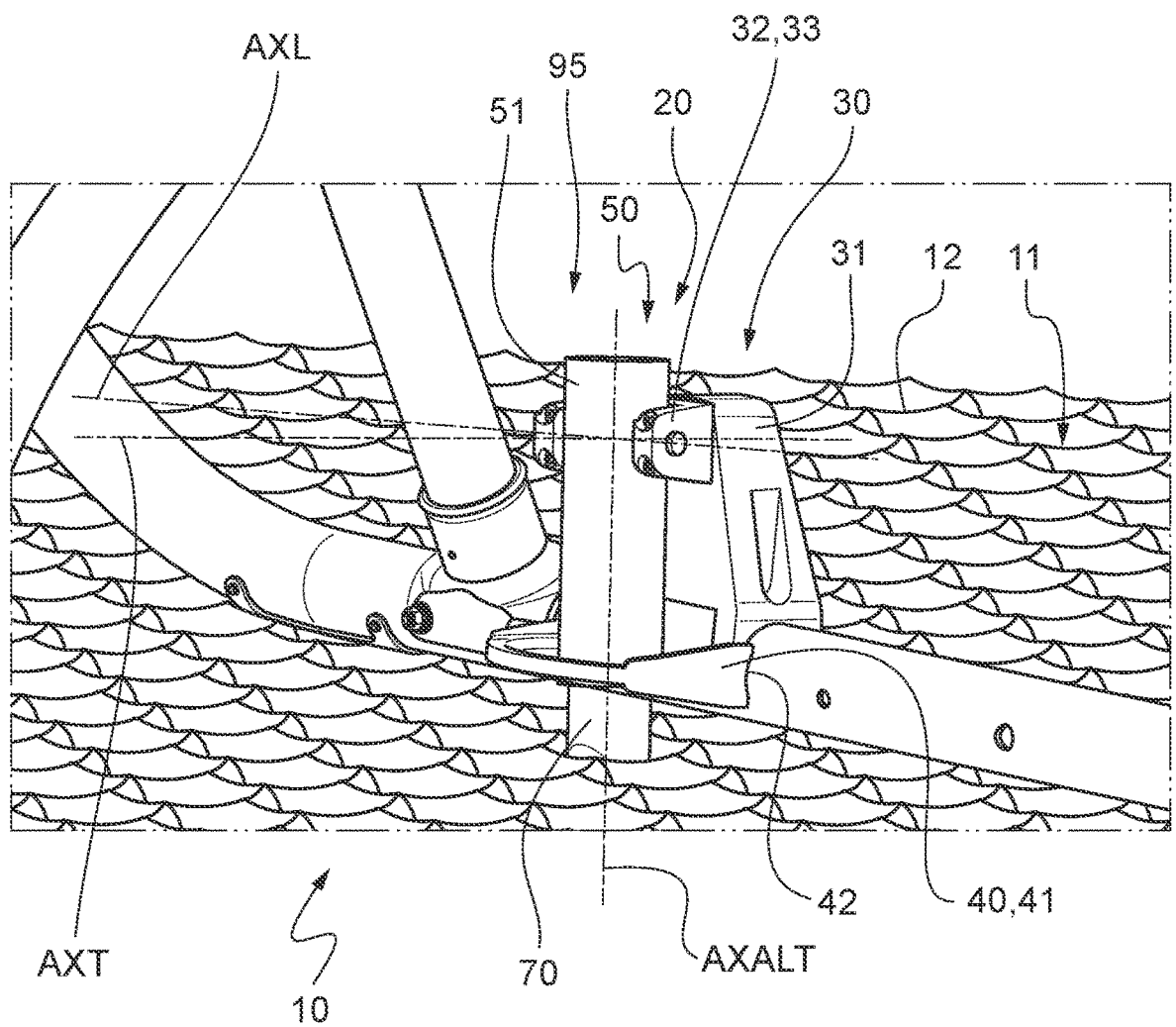
FIG. 4 is a three-dimensional view of an anchor having a head interfaced in a landing grid.

FIG. 3 shows an extended anchor 20 and FIG. 4 shows this same anchor 20 engaged in a landing grid 10. The anchor 20 is fastened, by way of illustration, to a skid 8, but the following explanations also apply when it is fixed to a bracket 15, unless otherwise stated.

In reference to FIG. 3, the anchor 20 comprises a jack 50. The jack 50 is provided with a housing 51 and a head 70 that is able to move in translation in relation to the housing 51 along an elevation axis AXALT in relation to the airframe or the skid.

Moreover, the head 70 has three degrees of rotational freedom ROT1, ROT2, ROT3 respectively about a longitudinal axis AXL as well as a transverse axis AXT and the elevation axis AXALT. The elevation axis may also be able to move in relation to the longitudinal axis AXL and the transverse axis AXT.

According to one example, the head 70 is only able to move in translation in relation to the housing 51, the housing 51 being able to rotate about the three abovementioned axes, possibly via a ball joint. In this case, the ball joint gives the jack freedom of movement about the longitudinal axis AXL, the transverse axis AXT and the elevation axis AXALT.

According to another example, the head 70 is for this purpose able to rotate ROT3 in relation to the housing 51 about the elevation axis AXALT, this elevation axis also being able to move in relation to the longitudinal axis AXL and the transverse axis AXT. The jack 50 may be articulated to a support 30 by an articulation that allows it to rotate in relation to the support 30 only about the longitudinal axis AXL and the transverse axis AXT. The support 30 is thus fastened, for example, to a landing gear 6 and, for example to a skid 8, or to a bracket 15.

According to the embodiment shown, the support 30 may comprise a frame 31 fastened to the landing gear 6 or to the bracket 15. Furthermore, the support 30 comprises an articulation 32 articulating the housing 51 to the frame 31 according to the longitudinal axis AXL and the transverse axis AXT. For example, the articulation 32 comprises a clevis 33 carried by a bearing or an equivalent of the frame 31 so as to be able to rotate about the transverse axis AXT, the jack 50 and, in particular, its housing 51, being articulated to the clevis 33 about the longitudinal axis AXL.

Figure 5:
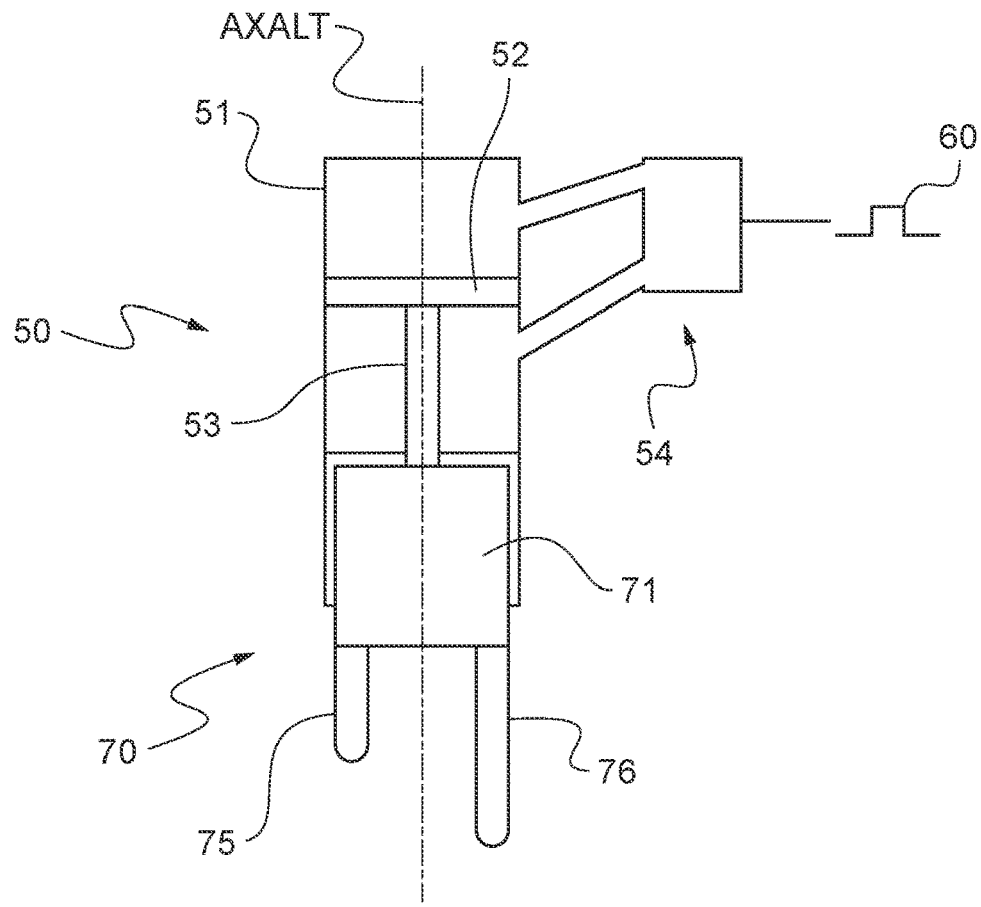
FIG. 5 is a schematic cross-section of a jack according to the disclosure.
Figure 6:
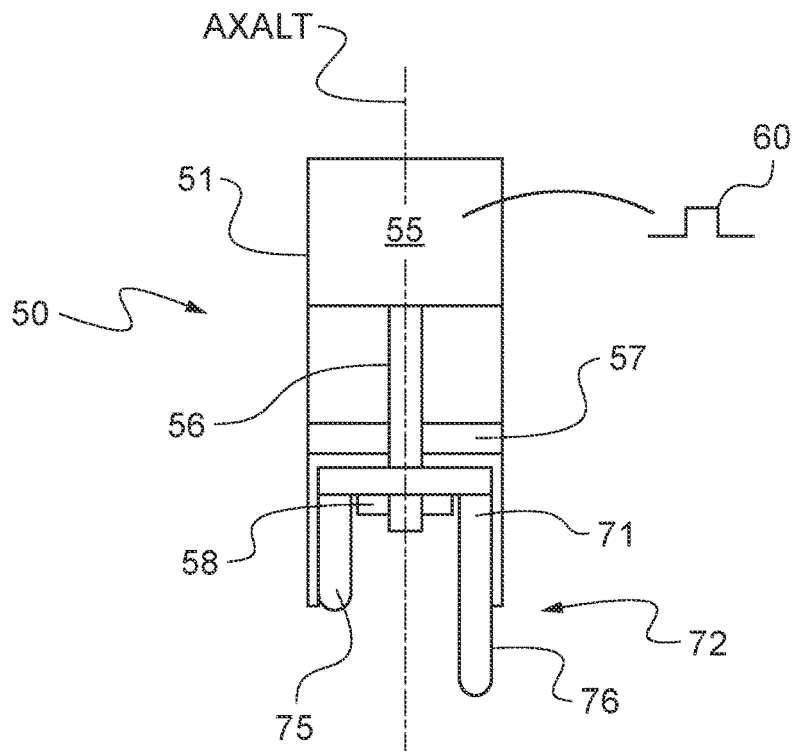
FIG. 6 is a schematic cross-section of a jack according to the disclosure.

The jack 50 may be of different types in order to move the head 70 in relation to the aircraft 1 and may be controlled by a control interface 60. Such a control interface 60 may comprise a button, a touch panel, a voice command, an antenna receiving a control signal, etc. FIGS. 5 and 6 show non-limiting examples of jacks.

FIG. 5 shows an example of a hydraulic or pneumatic jack 50, suitable for moving the head 70 in translation along the elevation axis AXALT while allowing it a degree of rotational freedom about this elevation axis AXALT.

According to this example, a piston 52 may separate the internal volume of the housing 51 into two chambers in communication with a hydraulic or pneumatic circuit 54 controlled by the control interface 60. The piston 52 is rigidly connected to a piston rod 53 carrying the head 70. Moreover, the head 70 is able to rotate about the elevation axis AXALT in relation to the housing 51. For example, the piston 52, the piston rod 53 and the head 70 may be able to rotate about the elevation axis AXALT in relation to the housing 51.

FIG. 6 shows an example of an electrical jack. The housing 51 accommodates an electric motor 55, for example a linear electric motor provided with an output rod 56 that is able to move in translation along the elevation axis AXALT. The head 70 may be linked to this output rod 56 with a degree of rotational freedom about the elevation axis AXALT. For example, the head 70 comprises a plate arranged between a shoulder 57 of the output rod 56 and a nut 58 or the like.

Irrespective of the variant, each jack 50 may comprise conventional sensors, means for immobilising the head 70 and/or may communicate with an alerter capable of indicating the position of the head to an operator.

Regardless of how the head 70 is rendered movable in relation to the aircraft 1 and in reference once more to FIG. 3, the anchor 20 comprises a member for taking up forces 40 for limiting the movements of the aircraft 1 in relation to the jack 50 and transmitting the forces experienced by the anchor 20 to this aircraft 1.

The member for taking up forces 40 locally surrounds the jack 50, for example below the articulation 32. Moreover, the member for taking up forces 40 is provided with one or more fastenings 42 for being fastened to the support 30, or to the landing gear 6, for example to the skid 8, if applicable, or to the bracket 15.

To this end, the member for taking up forces 40 may comprise a retaining ring 41 provided with the fastening or fastenings 42. Such a fastening 42 may comprise a hole through which a screw or a rivet passes, for example. The retaining ring 41 surrounds a volume through which the housing 51 passes. The retaining ring comprises a wall that runs in a closed line around the volume, or indeed around an axis of symmetry of the wall. The housing 51 is able to move in said volume. The jack 50 therefore has a limited freedom of movement in relation to the member for taking up forces 40.

In order to be correctly engaged in the landing grid 10, the head 70 may comprise a free end 72 comprising two abutments 75, 76. For example, the head 70 comprises a base 71 that is extended along the elevation axis AXALT by the two abutments 75, 76. The two abutments may extend parallel to each other.

The two abutments 75, 76 are stationary in relation to each other. The two abutments 75, 76 may be arranged to either side of the elevation axis AXALT. Moreover, a space 90 may separate the two abutments perpendicular to the elevation axis AXALT.

The dimensions of the two abutments 75, 76 are additionally determined such that they are able to penetrate together into a same aperture 11 in an immobilisation position, for example fitting into a cylinder smaller in radius than each aperture 11. Moreover, the dimensions of the two abutments 75, 76 are determined such that they can be fitted around a separator 12 in such a way that one abutment 75 is then in one aperture 11 and the other abutment 76 is in another adjacent aperture 11 in an immobilisation position.

In order to help position the abutments 75, 76 in an immobilisation position, each abutment 75, 76 may comprise an end section 77, 78 that tapers away from the housing 51. At least one end section 77, 78 may also be rounded.

Additionally, or alternatively, the two abutments 75, 76 are different.

Figure 7:
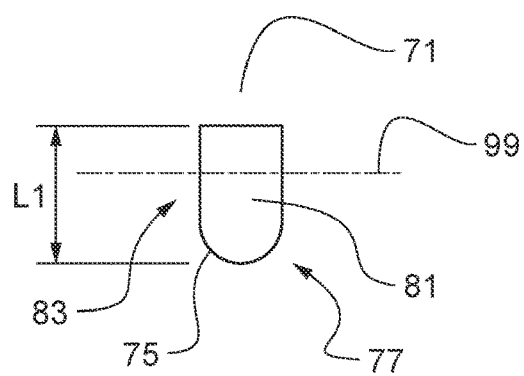
FIG. 7 is a schematic cross-section of a first abutment of a jack according to the disclosure.
Figure 8:
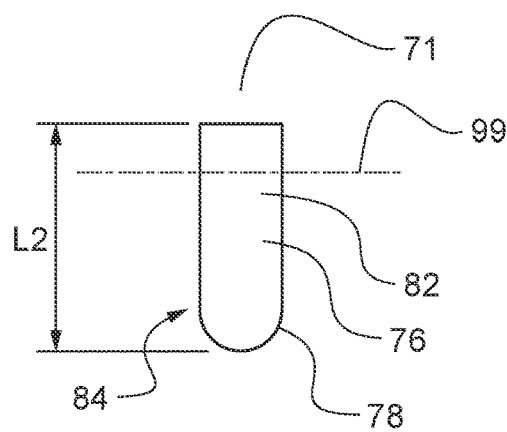
FIG. 8 is a schematic cross-section of a second abutment of a jack according to the disclosure.

Specifically, according to FIG. 7, a first abutment 75 may extend along the elevation axis AXALT over a first length L1 from the base 71, for example. According to FIG. 8, a second abutment 76 may extend along the elevation axis AXALT from the base 71, for example, over a second length L2 greater than the first length L1. Moreover, the second abutment 76 may have a rounded end with a radius larger than that of the first abutment 75.

Figure 9:
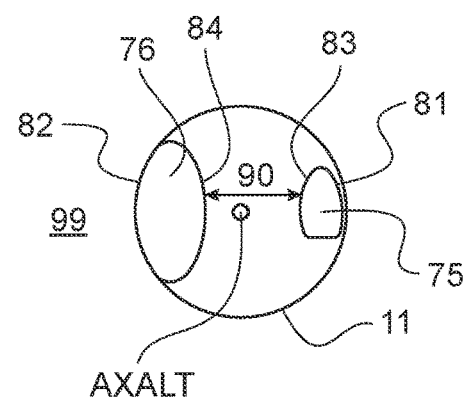
FIG. 9 is a schematic cross-section of the abutments of a jack according to the disclosure arranged in an aperture.

According to FIG. 9, the two abutments 75, 76 may each extend radially, with respect to the elevation axis AXALT, from a rounded inner face 83, 84 to a rounded outer face 81, 82. The two inner faces 83, 84 are opposite each other.

The two outer faces 81, 82 may each be concave with respect to the elevation axis AXALT. Conversely, the two inner faces 83, 84 may be convex with respect to the elevation axis AXALT.

In a plane 99 orthogonal to the elevation axis AXALT, one abutment may have a truncated oval cross-section whereas the other abutment may have an oval cross-section. According to the example shown, the first abutment 75 has a truncated oval cross-section whereas the second abutment 76 has an oval cross-section.

Figure 10:
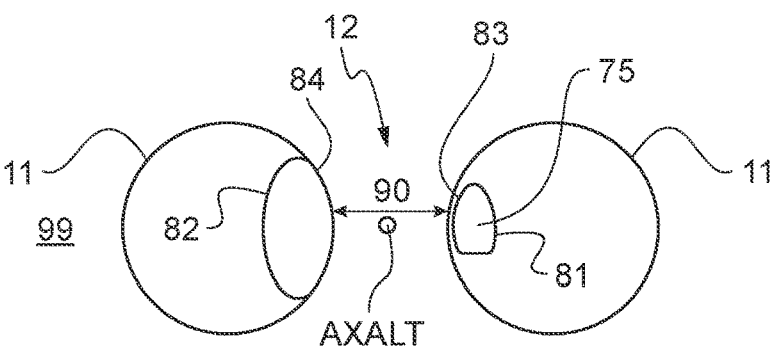
FIG. 10 is a schematic cross-section of the abutments of a jack according to the disclosure arranged around a separator.

According to FIG. 9, the two abutments 75, 76 may then fit into one aperture 11. According to FIG. 10, the two abutments 75, 76 may be arranged respectively in two adjacent apertures 11.

Figure 11:
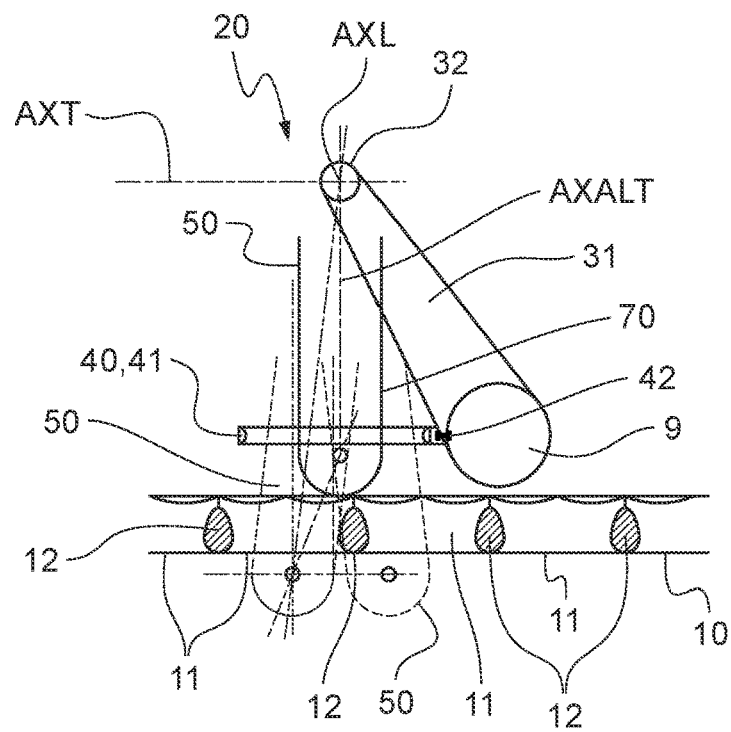
FIG. 11 is a diagram showing the operation of an anchor.
Figure 12:
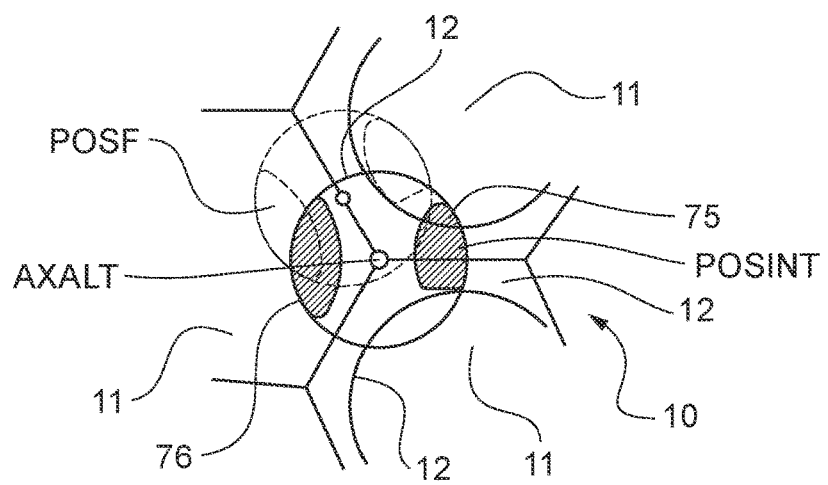
FIG. 12 is a diagram showing the positioning of a head of an anchor in an aperture.
Figure 13:
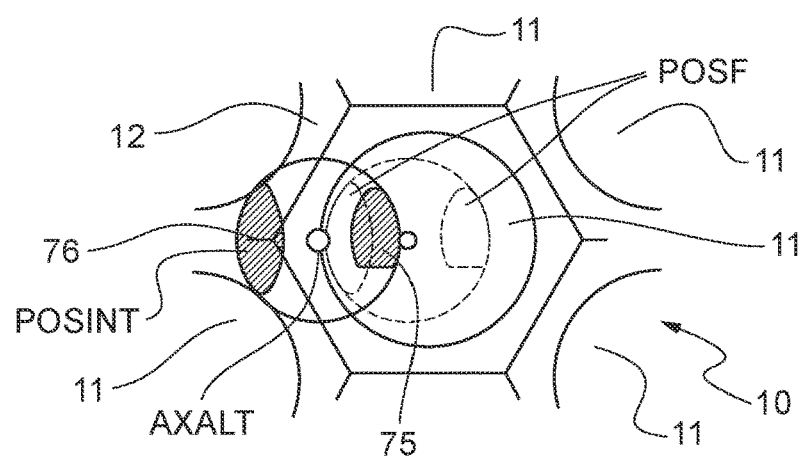
FIG. 13 is a diagram showing the positioning of a head of an anchor between two apertures.

FIGS. 11 to 13 show the operation of the anchor 20.

In reference to FIG. 11, when the aircraft 1 is landed, the jack 50 is extended, possibly at the command of the control interface 60. The head 70, shown schematically, moves towards the landing grid 10. The head 70 may then penetrate directly into an aperture 12 if such an aperture 11 is situated in line with the head 70.

However, if the head 70 touches the structure of the landing grid 10, the head 70 makes at least one rotational movement about one of the longitudinal AXL, transversal AXT or elevation AXALT axes, together with its movement in translation. The diagram shows various immobilisation positions that may be reached as a result of these movements.

FIGS. 12 and 13 show various situations.

According to FIG. 12, the first abutment 75 may touch the structure of the landing grid 10 whereas the second abutment 76 lies in an aperture 11, in an intermediate position POSINT. Extending the jack 50 then causes the head 70 to rotate, moving the first abutment 75 into a different aperture 11 to the second abutment 76 in the final immobilisation position POSF.

According to FIG. 13, the second abutment 76 may touch the structure of the landing grid 10, the first abutment 75, which is shorter, then lying over the landing grid 10. Extending the jack 50 then causes the head 70 to rotate, moving the first abutment 75 and the second abutment 76 into a same aperture 11 in the final immobilisation position POSF.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. An anchor for an aircraft, the anchor comprising a jack comprising a housing and a head movable in translation in relation to the housing along an elevation axis, the head having three degrees of rotational freedom respectively about a longitudinal axis, a transverse axis and the elevation axis, the anchor comprising a member for taking up forces surrounding the jack, the member having a fastening suitable for being secured to the aircraft, wherein the head comprises a free end comprising two abutments spaced apart from each other to enable both of the abutments to penetrate together into a same aperture of a landing grid, the head having a fixed shape, the two abutments being stationary relative to each other and separated from each other by a space configured to receive a separator of the landing grid separating two apertures to enable the free end of the head to engage the landing grid to anchor the aircraft to the landing grid.

2. The anchor according to claim 1,
wherein the anchor comprises a support carrying the jack, the jack being able to rotate in relation to the support about the longitudinal axis and the transverse axis, the head being able to rotate in relation to the housing about the elevation axis.

3. The anchor according to claim 1,
wherein each of the two abutments comprise an end section that tapers away from the housing.

4. The anchor according to claim 3,
wherein at least one of the tapered end section is rounded.

5. The anchor according to claim 1,
wherein the two abutments are different.

6. The anchor according to claim 5,
wherein one abutment of the two abutments extends parallel to the elevation axis over a first length and the other abutment extends parallel to the elevation axis over a second length greater than the first length.

7. The anchor according to claim 1,
wherein the two abutments each comprise a concave rounded outer face with respect to the elevation axis.

8. The anchor according to claim 1,
wherein the two abutments each comprise a convex rounded inner face with respect to the elevation axis.

9. The anchor according to claim 1,
wherein one abutment of the two abutments comprises an oval shape in a plane orthogonal to the elevation axis and the other abutment has a truncated oval shape in the plane.

10. The anchor according to claim 1,
wherein the member for taking up forces comprises a retaining ring surrounding a volume through which the housing passes, the housing being able to move in the volume.

11. An assembly comprising a landing grid having a plurality of apertures, each aperture being separated from an adjacent aperture by a separator of the landing grid,
wherein the assembly comprises the anchor according to claim 1, the abutments together having a shape that can fit into each aperture, the space having a shape that can contain each separator.

12. An aircraft,
wherein the aircraft comprises at least one anchor according to claim 1.

13. The aircraft according to claim 12,
wherein the aircraft comprises a landing gear, the fastening of the member for taking up forces being secured to the landing gear or to a bracket rigidly connected to an airframe of the aircraft.

14. The aircraft according to claim 12,
wherein the anchor comprises a support carrying the jack and the aircraft comprises a landing gear, the support fastened to the landing gear or to a bracket rigidly connected to an airframe of the aircraft.

15. The aircraft according to claim 14,
wherein the aircraft comprises a landing gear, the fastening of the member for taking up forces being secured to the landing gear, and wherein the landing gear is a skid landing gear, the fastening and the support being fastened to a skid of the landing gear, the support having an articulation carrying the jack, the articulation being situated above the member for taking up forces when the aircraft is landed.

16. An anchor for an aircraft, the anchor comprising a jack comprising a housing and a head movable in translation relative to the housing along an elevation axis, the head having three degrees of rotational freedom respectively about a longitudinal axis, a transverse axis and the elevation axis, the anchor comprising a retainer secured to the aircraft, wherein the head comprises a free end comprising two abutments dimensioned and spaced apart from each other to enable both of the two abutments to penetrate together into a same aperture of a landing grid, the head having a fixed shape, the two abutments being stationary relative to each other and separated from each other by a space configured to receive a separator of the landing grid separating two adjacent apertures so that the free end of the head engages the landing grid to anchor the aircraft to the landing grid when the head penetrate a same aperture of a landing grid.

17. The anchor according to claim 16,
wherein the retainer comprises a retaining ring surrounding a volume through which the housing passes, the housing being able to move in the volume within the retaining ring.

18. The anchor according to claim 16,
wherein the anchor comprises a support carrying the jack, the jack being rotateable relative to the support about the longitudinal axis and the transverse axis, the head being rotateable relative to the housing about the elevation axis, wherein the two abutments are different in at least one of size and shape relative to each other.

19. An assembly comprising a landing grid having a plurality of apertures, each aperture being separated from an adjacent aperture by a separator of the landing grid,
wherein the assembly comprises the anchor according to claim 16, the abutments together having a shape that can fit into each aperture at the same time, the space having a shape that can accommodate the separator.

20. An aircraft comprising at least one anchor according to claim 16,
wherein the aircraft comprises a landing gear, the retainer being secured to the landing gear or to a bracket rigidly connected to an airframe of the aircraft.

* * * * *